(12) United States Patent
Chopra et al.

(10) Patent No.: US 8,924,935 B1
(45) Date of Patent: Dec. 30, 2014

(54) PREDICTIVE MODEL OF AUTOMATED FIX HANDLING

(71) Applicant: EMC Corporation, Hopkinton, MA (US)

(72) Inventors: Shelesh Chopra, Bangalore (IN); William J Scott, Burlington (CA); Christopher W Sears, Dundas (CA)

(73) Assignee: EMC Corporation, Hopkinton, MA (US)

( * ) Notice: Subject to any disclaimer, the term of this patent is extended or adjusted under 35 U.S.C. 154(b) by 55 days.

(21) Appl. No.: 13/799,198

(22) Filed: Mar. 13, 2013

Related U.S. Application Data (63) Continuation-in-part of application No. 13/618,634, filed on Sep. 14, 2012, now Pat. No. 8,713,554.

(51) Int. Cl.
G06F 9/44 (2006.01)
(52) U.S. Cl.
CPC ........................................ G06F 8/71 (2013.01)
USPC ............................. 717/124; 717/121; 717/120
(58) Field of Classification Search
None
See application file for complete search history.

(56) References Cited

U.S. PATENT DOCUMENTS

| | | | |
|---|---|---|---|
| 5,586,304 A | 12/1996 | Stupek et al. | |
| 6,336,217 B1 * | 1/2002 | D'Anjou et al. | 717/121 |
| 6,763,517 B2 | 7/2004 | Hines | |
| 6,954,928 B2 * | 10/2005 | Allsop et al. | 717/168 |
| 7,020,875 B2 | 3/2006 | Zweifel et al. | |
| 7,568,183 B1 | 7/2009 | Hardy et al. | |
| 7,689,972 B2 * | 3/2010 | Sah et al. | 717/124 |
| 7,805,719 B2 | 9/2010 | O'Neill | |
| 8,151,248 B1 * | 4/2012 | Butler et al. | 717/124 |
| 8,302,088 B2 | 10/2012 | Matthiesen | |
| 8,332,808 B2 * | 12/2012 | Kierans et al. | 717/101 |
| 8,468,516 B1 | 6/2013 | Chen et al. | |
| 8,595,686 B2 * | 11/2013 | Koyama | 717/101 |
| 2003/0033597 A1 * | 2/2003 | Allsop et al. | 717/169 |
| 2004/0230964 A1 | 11/2004 | Waugh et al. | |
| 2004/0261070 A1 | 12/2004 | Miller et al. | |
| 2007/0130232 A1 | 6/2007 | Therrien et al. | |
| 2007/0143351 A1 | 6/2007 | Sawaya et al. | |
| 2007/0240102 A1 * | 10/2007 | Bello et al. | 717/104 |
| 2009/0210857 A1 * | 8/2009 | Martineau | 717/120 |
| 2009/0259999 A1 | 10/2009 | Srinivasan | |
| 2010/0095273 A1 * | 4/2010 | Matthiesen | 717/120 |
| 2010/0180259 A1 * | 7/2010 | Lindley | 717/124 |
| 2011/0107299 A1 | 5/2011 | Dehaan | |

(Continued)

OTHER PUBLICATIONS

Frei et al., "Large-scale vulnerability analysis," 2006, Proceedings of the 2006 SIGCOMM workshop on Large-scale attack defense, pp. 131-138.*

(Continued)

*Primary Examiner* — Thuy Dao
*Assistant Examiner* — Stephen Berman
(74) *Attorney, Agent, or Firm* — Staniford Tomita LLP (57) ABSTRACT

This disclosure relates to a method, article of manufacture, and apparatus for predictive model of automated fix handling. In some embodiments, this includes decomposing a fix for a defect to features, establishing a mapping of the defect and the fix for the defect by associating the features with the defect, storing codes implementing the fix in directories indicating the corresponding features, adding an association of a test case with the features to the mapping, and applying a rule to the mapping to calculate a vulnerability of the fix.

13 Claims, 8 Drawing Sheets

(56) References Cited

U.S. PATENT DOCUMENTS

| | | | |
|---|---|---|---|
| 2012/0042302 A1* | 2/2012 | Sikandar et al. | 717/125 |
| 2012/0222007 A1 | 8/2012 | Allen et al. | |
| 2012/0284694 A1 | 11/2012 | Waugh et al. | |
| 2013/0014083 A1 | 1/2013 | Martineau | |
| 2013/0047137 A1* | 2/2013 | Bak et al. | 717/121 |
| 2013/0254745 A1* | 9/2013 | Tiwari | 717/124 |
| 2013/0254746 A1* | 9/2013 | Balakrishnan et al. | 717/124 |
| 2013/0283252 A1 | 10/2013 | Mannarswamy et al. | |

OTHER PUBLICATIONS

Mell et al., "Creating a Patch and Vulnerability Management Program," 2005, Recommendations of the National Institute of Standards and Technology (NIST), pp. 1-75.*

Arora et al., "An Empirical Analysis of Vendor Response to Disclosure Policy," 2005, H. John Heinz III School of Public Policy and Management Carnegie Mellon University, pp. 1-20.*

Perkins et al., "Automatically patching errors in deployed software," 2009, SOSP '09 Proceedings of the ACM SIGOPS 22nd symposium on Operating systems principles, pp. 87-102.

Hicks et al., "Dynamic software updating," 2001, Proceedings of the ACM SIGPLAN 2001 conference on Programming language design and implementation, pp. 13-23.

Sidiroglou et al., "Countering Network Worms Through Automatic Patch Generation," 2003, pp. 1-17, downloaded from the Internet on Feb. 20, 2014 from <url>http://academiccommons.columbia.edu/item/ac:109724.

* cited by examiner

| COMPONENT# | ICV | OCV | DEPENDENCY MAP |
|---|---|---|---|
| 1 | -10 | -90 | Component( 2+3+4+5+6+7+8+9) |
| 2 | -10 | -40 | Component(4+5+6) |
| 3 | -10 | -40 | Component(7+8+9) |
| 4 | -10 | -10 | No Additional Dependency |
| 5 | -10 | -10 | No Additional Dependency |
| 6 | -10 | -10 | No Additional Dependency |
| 7 | -10 | -10 | No Additional Dependency |
| 8 | -10 | -10 | No Additional Dependency |
| 9 | -10 | -10 | No Additional Dependency |

Columns labeled 610, 620, 630, 640.

| COMPONENT | #SEV1 | #SEV2 | #SEV3 | #SEV4 | #impacted customers | Dependency Map | ICV | OCV | Code Density |
|---|---|---|---|---|---|---|---|---|---|
| A | 2 | 2 | 2 | 2 | 2 | B+C+D+E+F | -30 | -330 | 10 |
| B | 3 | 3 | 3 | 3 | 2 | C+D+E+F | -40 | -300 | 20 |
| C | 4 | 4 | 4 | 4 | 2 | D+E | -50 | -180 | 1 |
| D | 5 | 5 | 5 | 5 | 2 | NIL | -60 | -60 | 2 |
| E | 6 | 6 | 6 | 6 | 2 | NIL | -70 | -70 | 2 |
| F | 7 | 7 | 7 | 7 | 2 | NIL | -80 | -80 | 1 |

Notes:
ICV = (# of Sev1 * -4)+(# of Sev2 * -3)+(# of Sev3 * -2)+(# of Sev 4 * -1) + (# of Impacted Customers * -5)
OCV = Σ All ICV (Individual + Dependent Component)
Code Density: Code Churn in KLOC

PREDICTIVE MODEL OF AUTOMATED FIX HANDLING

CROSS-REFERENCE TO RELATED APPLICATIONS

This application is a continuation-in-part of co-pending U.S. patent application Ser. No. 13/618,634 for AUTOMATED HOTFIX HANDLING MODEL filed Sep. 14, 2012, which is incorporated herein by reference for all purposes.

FIELD

The present invention relates generally to computer systems and specifically to systems and methods of releasing computer software.

BACKGROUND

Software development is inherently complex. Software applications often require updates after release to ensure their continued property functioning. Such updates may be periodic, or in response to a particular event, such as a defect reported by a user from the field. Currently, there are various software engineering techniques, such as modeling techniques, prototyping, and different methodologies to aid the development of software with the goal of improving the code quality. And there are many ways to gather feedback of software applications from the field using various defect tracking tools. However, the linkage between field-identified defects and a corresponding engineering fix may be lacking.

For example, the assessment of priority and urgency of field problems, as well as the assessment of priority and urgency of the corresponding fixes may be inadequate. As a result, there is no clear understanding of the code stability and vulnerability in response to field problems during various stages of software development and release process. Even if state of the art software engineering techniques are used during the code development, without a clear understanding of what the problem the software application needs to address, the code fixes may not server their purpose. Further, the lacking of the linkage between defects and a corresponding engineering fix may have cumulative effect. As more features released building on codes that lack of impact analysis, it may be more and more difficult to understand and rework the field problems.

There is a need, therefore, for an improved method or system capable of predictive analysis during automated computer software release.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Disclosed herein are methods and systems of automated hotfix handling, including highly automated defect tracking, defect fixing, fix committing, testing, and releasing procedures. Software applications often require updates after major releases to ensure their proper functioning. Such updates may be periodic, or in response to a particular event, e.g. a defect reported by a user. Large pieces of software that significantly change a program may be referred to as service packs. A service pack may be a collection of updates, fixes, or enhancements to a software product delivered in the form of a single installable package. In between the releasing of different versions of service packs, some relatively small in size software packages may be made available to users that aim at fixing problems, such as defects in the source code, usability and/or performance etc. Such software packages, which contain pointed code changes and have shorter software development cycle, are known as hotfixes. Hotfixes play a critical role in any major product line. Service packs and major releases have their own specific schedules. For an enterprise customer, issues such as bugs in source codes, data unavailability, and data loss may require an immediate relief. Thus, hotfixes release process acts as a bridge to get the relief to the customer soon. And accumulation of hotfixes over a period of time may be delivered as cumulative hotfixes.

Even though small in size and short in terms of development cycle, hotfixes still require extensive defect tracking and testing prior to releasing. Current approaches to hotfixes handling often face many challenges. One challenge is the maintenance overhead. The overhead may come from lack of coordination of different hotfixes. For example, a hotfix for an operating system and/or platform may need to be ported to a different operating system and/or platform. Maintaining and tracking multiple hotfixes for multiple operating systems and/or platforms and possibly in different release processes may be overwhelming.

Another challenge is the lack of involvement from critical stake owners. Currently, in almost all the organizations, hotfixes release process is owned fully or predominantly by one team, and there is less of the involvement from other critical stake owners, such as development team, QA team, and support team, among others. Due to lack of involvement in hotfix handling process, different feature owners may not have much visibility in what is accomplished by which hotfix release. Lack of coordination and communication among different teams may cause inefficiency in hotfixes release process.

An additional challenge is presented by the current manual/semi-manual hotfix release process. Current approaches to hotfixes handling often necessitate a user to manually inspect a defect after the defect is reported. The manual inspection may determine if the reported defect belongs to a cumulative hotfix category. After determining the defect is a cumulative hotfix candidate, the user may manually send out notifications to developers. Developers receiving the notification may then work on a fix and submit the fix to a build process before send out manual notification to a testing team. The testing team upon receiving the notification, may put together testing scripts, run tests, and conduct several rounds of interaction with developers to pass the testing phase. Upon a successful test, the hotfix may be manually communicated and distributed to users. Such a manual process is inefficient and error prone.

In some embodiments of the present invention, an automated hotfix handling model may be used to streamline the hotfix release process and overcome some of the challenges noted above. Instead of handling one hotfix at a time, the automated hotfix handling model cumulates multiple hotfixes and involves critical stake owners from multiple teams to formalize the cumulative hotfix (CHF) release process. Throughout the formalized CHF release process, automated notifications facilitate the coordination of more efficient parallel development effort among various teams. And multiple hotfixes for multiple operating systems and/or platforms may be gathered in one CHF to reduce the maintenance overhead.

Figure 1:
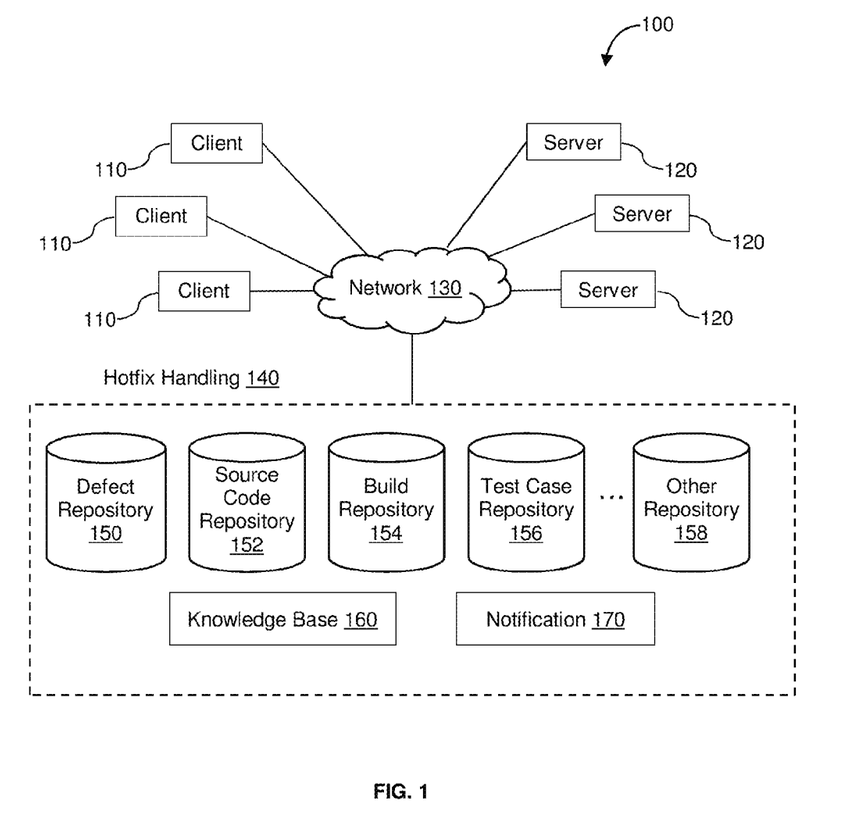
FIG. 1 is a diagram of a system configured to implement an automated hotfix handling model in accordance with some embodiments.

FIG. 1 illustrates an exemplary environment in which automated hotfix handling model may be implemented, in accordance with some embodiments. Data Storage System 100 may contain Clients 110, Servers 120, and Hotfix Handling module 140 connected by Network 130. Client 110 may represent a system, such as a laptop, a desktop, a mobile device, or a virtual machine, etc., used to generate requests to applications executing in Servers 120. Server 120 may represent a web and/or application server, which executes applications capable of performing tasks requested by users using Clients 110. The applications may perform tasks on data maintained internally or externally and send the result to Clients 110. It should be noted that different modules of the same application may be deployed and executed on different systems to facilitate the performance of tasks. As illustrated by FIG. 1, there may be any number of clients and any number of servers.

Network 130 may provide connectivity between the various systems of FIG. 1 and may be implemented using protocols such as Transmission Control Protocol (TCP) and/or Internet Protocol (IP), well known in the relevant arts. Network 130 may also be implemented to provide support for various storage architectures such as storage area network (SAN), Network-attached Storage (NAS), Direct-attached Storage (DAS), etc.

In some embodiments, Hotfix Handling module 140 may include various repositories, such as Defect Repository 150, Source Code Repository 152, Build Repository 154, Test Case Repository 156, and Other Repository 158, among others. Hotfix Handling module 140 may also include Knowledge Base 160 and Notification 170. Knowledge Base 160, in accordance with some embodiments, may be a non-volatile storage maintaining entries such as recommendations for fixing defects determined in Data Storage System 100. The identified recommendations may include possible solutions, suggestions, and workarounds for fixing the determined defects. The content of the recommendations may be derived from descriptions associated with defects stored in Defect Repository 150 and comments associated with a hotfix stored in Source Code Repository 152, among others. At various stages of the automated hotfix handling model, Notification 170 may be sent out through web pages, RSS feed and/or emails, among others. The content of Notification 170 may be obtained from entries stored in databases, or logs, reports stored in repositories.

Defect Repository 150 may be used to receive defects submitted by users. The defects may include, without limitation, logical errors, functional errors, and/or runtime errors that may cause applications not performing and/or functioning as expected. When submitting a defect, the defect may be associated with various attributes. Such attributes may include a unique defect identifier, a description describing the defect, owner assignment, status of the defect, and the type of the defect, among others.

The status of the defect may be used to facilitate the goals of accountability and closed-loop problem resolution. Critical stake owners may be notified automatically of the status of a defect. Once notified, owners responsible for corresponding actions may take corrective actions and the status of a defect may be changed. Once the status of a defect is changed, more automated notifications may be sent to critical stake owners for further actions. For example, a set of status tracking a defect may be action initiated, assigned-dev, assigned-qa, in progress-dev, in progress-qa, closed-dev, closed-qa, and action closed. After a defect is submitted, whenever the defect status changes, automated notification may be triggered. Critical stake owners may be notified automatically, so that they may take ownership and appropriate actions. The automated process continues until the action is closed.

The type of the defect may indicate whether the defect submitted is a CHF candidate. In some embodiments, the type may be selected from a list of options provided by a defect tracking tool associated with Defect Repository 150. Such defect tracking tool may let a user select from a list of categories indicating the type of the defect submitted. Subcategories indicating whether the defect type is related to data loss, data unavailability, or security vulnerability may be further provided to the user. The subcategories may indicate the severity of the defect. Depending on the severity of the defect, more automated steps may be taken to expedite the availability of the fix to users. For example, if a defect belongs to a subcategory indicating the defect may cause system crash, the defect may qualify for automatic check-in approvals. In some embodiments, the defect tracking tool may be Rational ClearQuest®. ("ClearQuest" is a registered trademark of International Business Machines Corporation in the United States, other countries, or both.) Other defect tracking tools providing similar functionalities may also be used.

Source Code Repository 152 may be used to receive and store check-in data related to CHF. Software Repository 152 may be associated with a version control system to manage the numerous versions of source codes checked in. During code development, developers may check out source codes from Source Code Repository 152 to work on and check them back in at the end of the work session. Version control system, such as concurrent versioning system (CVS), generally keeps tracks of what changes were made to the source codes. Other version control systems providing similar functionalities may also be used. The check-in data stored in Source Code Repository 152 may include source code to fix one or more defects received in Defect Repository 150. Unique defect identifiers stored in Defect Repository 150 may be used as a cross reference to associate source codes with defects. In addition, the check-in data may also include a developer's name, source code file name, product, release, check-in time, total number of lines, number of lines changed, and comments etc.

In some embodiments, the same version control system may also be associated with Build Repository 154. The version control system may execute scripts to compile source codes stored in Source Code Repository 152 and generate executable codes to store in Build Repository 154. Each build may be associated with a version and the version of the CHF. Following a successful build process, the build stored in Build Repository 154 may be tested using test cases stored in Test Case Repository 156. In accordance with some embodiments, the test cases may be mapped to one or more builds to automate the hotfix handling process. A determination of a clean build may trigger automated execution of corresponding test cases. Upon successful completion of testing, a build may be released as postings to users.

Figure 2:
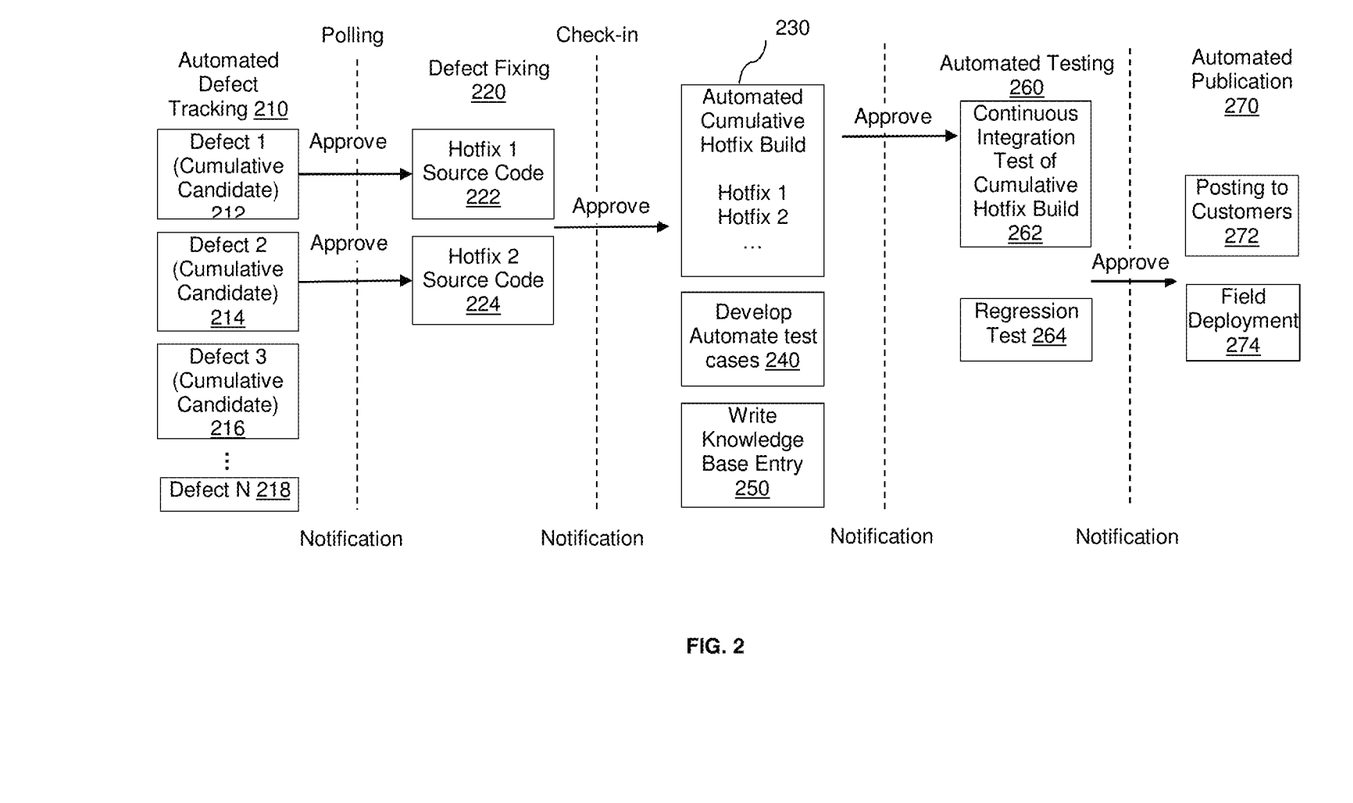
FIG. 2 is a diagram of an automated cumulative hotfix release process in accordance with some embodiments.

FIG. 2 is a block diagram illustrating the automated cumulative hotfix release process, in accordance with some embodiments. During Automated Defect Tracking 210, defects may be submitted. When submitting each defect, the description of the defect as well as the type of the defect may be specified. For example, as illustrated in FIG. 2, Defect 1 212, Defect 2 214, and Defect 3 216 may be categorized as CHF candidate type. On the other hand, Defect N 218 may be categorized as some type other than CHF candidate.

In some embodiments, based on predefined rules, an automated polling process may search through defects submitted to identify one or more types of defects. For example, as illustrated in FIG. 2, a set of predefined rules may be used by the automated polling process to identifying all new defects submitted within CHF candidate category. Applying the rules, Defect 1 212, Defect 2 214, and Defect 3 216 may be identified by the automated polling process. Upon identifying CHF candidate type of defects, an automated notification may be sent to critical stake owners. Critical stake owners may then approve or reject a defect as a CHF candidate. As illustrated in FIG. 2, critical stake owners may approve only Defect 1 212 and Defect 2 214, but reject Defect 3 216. Only approved defects may be worked on during Defect Fixing 220. In contrast, critical stake owners may determine that a fix for Defect 3 216 should not be included in a current cumulative hotfix release, thus reject Defect 3 216.

Once the source codes for Defect Fixing 220 are checked in, an automated notification may be sent to critical stake owners for approval. Upon approval of the check-ins, Automated Cumulative Hotfix Build 230 may start to compile source codes and generate executable codes as a build. The build may cumulatively include hotfixes for various approved defect fixes, such as Hotfix 1, Hotfix 2, etc. In parallel, automated test cases may be developed, denoted as 240 in FIG. 2, to map test cases to the build. Similarly, in parallel, knowledge base entries may be written, denoted as 250 in FIG. 2, based on defects description and comments associated with check-ins.

Once Automated Cumulative Hotfix Build 230 completes, an automated notification may be sent to critical stake owners for approval. Having approved the build, an automated notification may be sent to critical stake owners. Upon approval, Automated Testing 260 may execute the automated test cases to run Continuous Integration Test of Cumulative Fix Build 262. Further, more extensive Regression Test 264 may be conducted. Upon completion of Automated Testing 260, an automated notification may be sent to critical stake owners for approval. Upon approval of a successful testing, Automated Publication 270 may publish Posting to Customers 272 and the published cumulative hotfix may be deployed in field, denoted as 274 in FIG. 2.

The automated cumulative hotfix release process in accordance with some embodiments described herein has several benefits. The formalized process involves critical stake owners. Critical stake owners are automatically notified of the progress from the point of receiving a defect to the final release. The involvement of critical stake owners also helps in prioritizing different tasks and improving efficiency.

For example, an automated notification after polling to critical stake owners may help in prioritizing fixes for Defect 1 212, Defect 2 214, Defect 3 216 . . . Defect N 218. Fixes for a defect such as Defect 1 212 may have a higher priority to work on since it is in a CHF candidate category. In another example, once the fixes for the Defect 1 212 and Defect 2 214 are approved by critical stake owners, automated cumulative hotfix build 230, developing automated test cases 240, and writing knowledge base entries 250 may be in progress simultaneously. The parallel process among various teams is more efficient.

Further, having multiple hotfixes bundled in one CHF eradicates the need of porting requests and improves maintainability. Due to the involvement of critical stake owners, different feature owners have increased visibility of what need to be accomplished in which cumulative hotfix release. Multiple hotfixes for multiple operating systems and/or platforms may be developed and gathered in one CHF to reduce the maintenance overhead.

Figure 3:
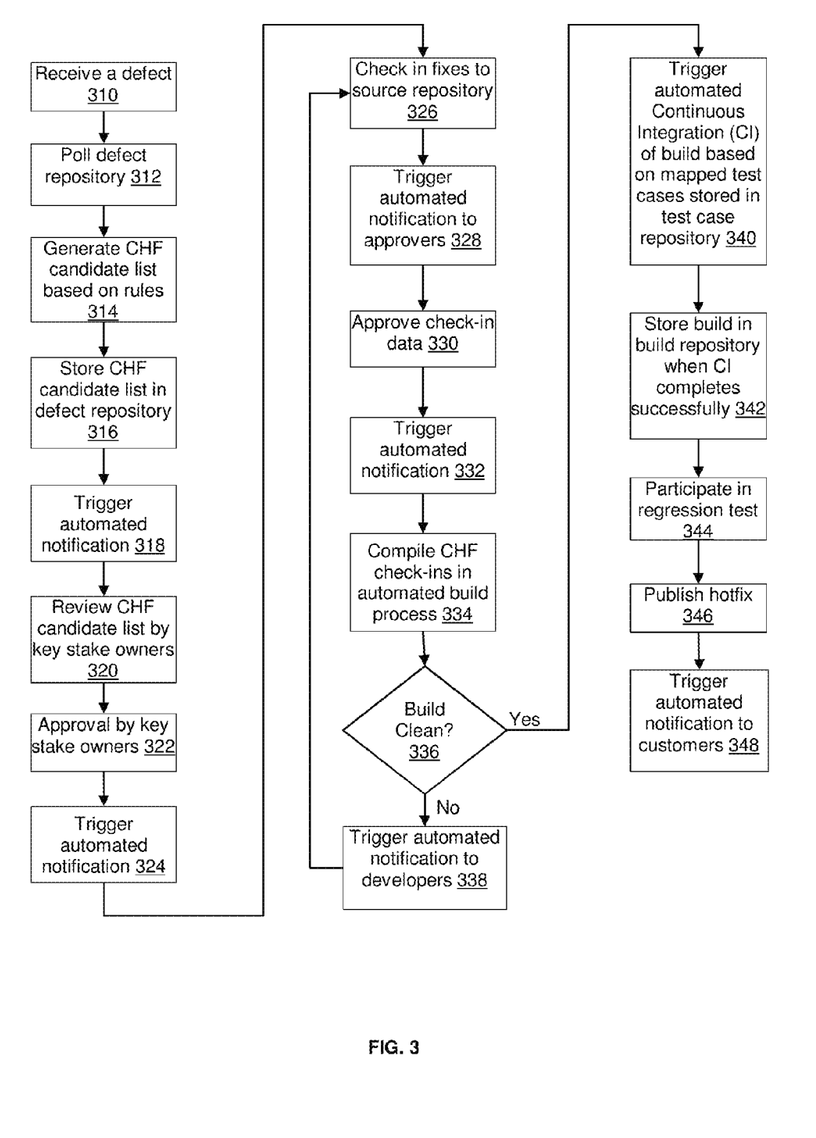
FIG. 3 is a flow chart illustrating a method to perform an automated cumulative hotfix release in accordance with some embodiments.

FIG. 3 illustrates one embodiment of a flowchart of operations for performing an automated cumulative hotfix release. In the depicted embodiment, the automated process begins when one or more defects were submitted to Defect Repository 150 in step 310. The defect may be associated with a description describing the nature of the defect and a keyword indicating the type of the defect, such as whether the defect is a CHF candidate. A polling process in step 213 may query Defect Repository 150 to obtain one or more defects based on a set of predefined rules. The query may look up the keyword associated with each defect submitted and match the keyword with the rules. Based on the rules, in step 314, a CHF candidate list may be generated. The CHF candidate list may include one or more defects submitted to Defect Repository 150, and each defect may be associated with a keyword indicating the defect type as a CHF candidate. Once the CHF candidate list is generated, the list may be stored in Defect Repository 150 in step 316. Further, an automated notification process may be triggered in step 318 to send out updates to critical stake owners. Depending on the notification method each critical stake owner subscribes to, the method of notification may be via email, RSS feed or through website updates. The content of the notification may be derived from reports and/or logs stored in databases or repositories.

Upon receiving the notifications, critical stake owners may approve one or more defects in the CHF candidate list as hotfix candidates, in step 322. Although not shown in FIG. 3, alternatively, critical stake owners may reject one or more defects in the CHF candidate list. The rejected defects will not be part of a current CHF build. Following the approval, an automated notification process may be triggered in step 324 to send out updates to critical stake owners. The automated notification may allow different teams to work on the defects in parallel. For example, developers may start to fix the defect; QA team may start to develop automated test cases for testing the defect; and support team may start to write knowledge base entries to describe the defect and possible fixes for the defect.

In some embodiments, the approval or rejection may be conducted through a user interface associated with Defect Repository 150. For example, the user interface may permit the users to select from a list of options to indicate the status of each defect. One of the options may be approving a defect as a CHF candidate. By selecting the approving option, an approval process may trigger automated notifications. In addition, during the approval process, the defect may be associated with a software release version. Subsequently, the software release version may be associated with corresponding check-ins for a fix of the defect, one or more builds containing the check-ins, one or more automated test cases, and one or more knowledge base entries.

In step 326, fixes for the defect approved may be received and checked in to Source Code Repository 152. The check-in data may correspond to one or more defects. Check-in data may include source code along with meta data associated with the source code. Version control system, such as concurrent versioning system (CVS) may be used to enter and display the meta data. In some embodiments, meta data may include, but not limited to, a defect identifier cross referencing the defect stored in Defect Repository 150, the corresponding CHF release version, the severity, the status, a summary, the product the source code is related to, requester, developer, changes involved, and comments.

Following the check-in process, an automated notification may be triggered to send updates to critical stake owners, in step 328. The check-in data may then be approved in step 330. The approval in step 330 may trigger automated notification to critical stake owners in step 332 as well as trigger an automated compilation process in step 334. The automated compilation process in step 334 may generate a build. Since the check-in data is associated with a CHF release version, the build containing the check-in data may also be associated with the same software release version. Although not shown in FIG. 3, the check-in data may be rejected by critical stake owners. If rejected, the developers may be notified through an automated process. And the rejected check-in data will not be compiled into the CHF build.

Upon completion of the build, the build may be examined in step 336 to determine if the build is clean. If the build contains any errors, the cause of the errors may be examined. For example, one or more source codes may be the cause of the errors. Based on the meta data for the source codes, the developers making changes to the source codes may be located. Automated notification may be sent to the developers in step 338, so that the errors may be analyzed and changes may be made to source code to correct the errors. Subsequently, the new fix may be checked into Source Repository in step 326.

On the other hand, if the build is clean, using the automated test cases developed by QA for the CHF release version, an automated continuous integration (CI) of the build may be triggered in step 340. Continuous integration is a technique that has been practiced in the field of software development and is well known in the art. When CI completes successfully, in step 342, the build may be stored in Build Repository 156. The stored build may participate in more extensive regression test in step 342. Although not shown in FIG. 3, if either CI or the regression test fails, the build may not be released. When the regression test completes without error, the build may be published as a CHF release in step 346, and in step 348, an automated notification may be triggered to let customers know the availability of the cumulative hotfix. Along with the publication of the CHF release, knowledge base entries are also complete by support team.

Disclosed herein are methods and systems capable of predictive analysis of automated fix handling. Software applications often require updates after release to ensure their continued proper functioning. Such updates may be periodic, or in response to a particular event, e.g. a defect reported by a user from the field. One challenge faced in fix handling may be a lack of understanding of the code stability and vulnerability, especially when complex software applications packaged as fixes have multi-layered architectures. Currently, there are many ways to report defects from the field. However, the lacking in predictive analysis of impact at various levels of the software application may not provide a sense of appropriate or relative priority and urgency to the engineers when working on fixes.

In some embodiments of the present invention, a predictive model of automated fix handling may be used to assess priority and urgency in response to field reported defects during the automated fix handling process. Predictive analysis may rely on historical data to derive a model of expected system behavior. Predictive modeling techniques may build a current set of metrics for a system and use the metrics to indicate that a future event is possible or likely to occur.

In applying predictive modeling techniques to automated fix handling, defects may be classified to different categories, based eg. on defect attributes. And the corresponding fixes may be decomposed or separated to different parts in multi-layered architectures. The predictive model may then form mappings of the defects to various parts of the fixes, in order to build a current set of metrics for automated fix handling. The mapping may effectively establish the linkage between the defects and the corresponding fixes. For example, using the mapping and the values assigned to the attributes, the predictive model of automated fix handling may be used in certain embodiments to accurately calculate the code vulnerability and impact by observing the historical data. Further, embodiments may provide that the quantified code vulnerability values may then be used to indicate the vulnerability and stability of future releases and updates.

In certain embodiments, the mapping may further be extended to establish a linkage throughout the entire automated fix release process. That is, the linkage may connect a field-reported defect to the point/location of the effective areas of the fix code coverage are in automated test suits. Embodiments may provide that the direct mapping from end-to-end of the automated fix release process, e.g. from code vulnerability to where automated tests need to be executed, may then be used to predict code impact, improve code quality, and facilitate automated testing in present and future releases.

During the development of a fix in the predictive model of automated fix handling, various software engineering techniques may be used in certain embodiments to formalize the development process. One practice is to analyze the software application in multi-layered architectures. For example, each layer may represent an aspect of the software. Embodiments may further provide that fixes provided by software applications may be analyzed at different granularity or specificity.

Figure 4:
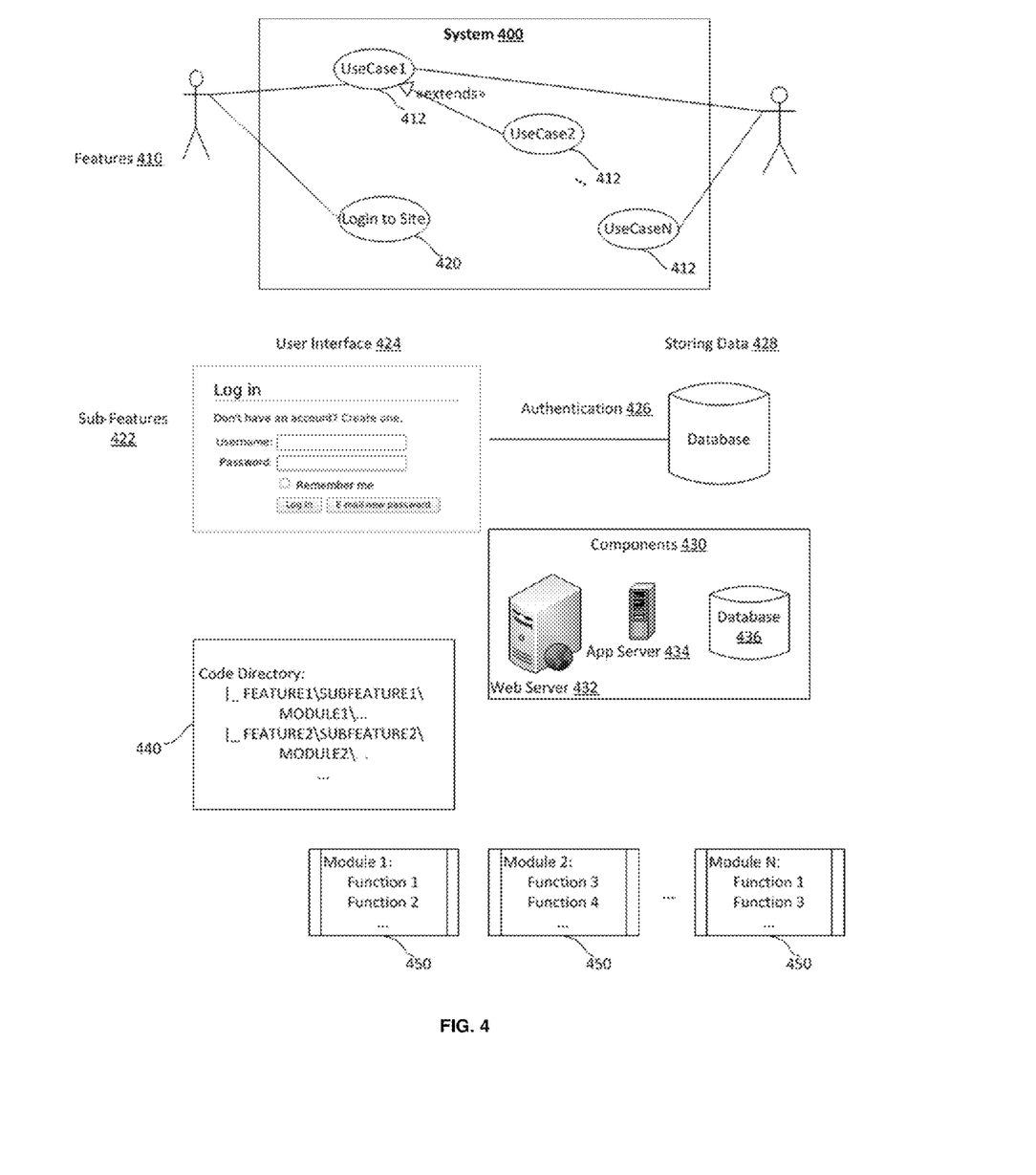
FIG. 4 is a diagram of a predictive analysis of fixes in accordance with some embodiments.

FIG. 4 illustrates a fix analysis at feature, sub-feature, component, code directory, module, and function level, in accordance with some embodiments. In some embodiments, software applications may be decomposed or broken down to multi-layered granular, sub-granular, or multi-granularity parts. The granular parts may then be linked to field reported defects. Further embodiments may provide that the mapping may be provided to engineers during automated fix handling. The decomposing and the linkage established in the mapping may allow engineers a better understanding of the code impact when working on fixes for defects.

Features 410 may be e.g. software application requirements for fixes. In some embodiments, features may be presented as high-level use cases. Similar software engineering techniques for code development and analysis well known in the relevant arts may also be used. A high-level use case may describe the interaction between or among one or more actors and a system to achieve some system goals. For example, FIG. 4 illustrates exemplary interactions between actors and System 400 to achieve system goals, e.g. web authentication. The high-level use cases may include Use Case 1 414, Use Case 2 414 . . . Use Case N 414 and a use case for a particular function method request or service, for example, Login to Site 420. Each use case may represent one or more features, methods, etc. of System 400. Further embodiments may further divide Features 410 to Sub-Features 422.

In the exemplary System 400, feature Login to Site 420 may include sub-features, such as User Interface 424 for displaying a login screen, Authentication 426 for sending the login information collected from User Interface 424 to a database for validation, and Storing Data 428 for saving the authentication information to the database. Each sub-feature may include one or more Components 430. For example, component Web Server 432 may handle login requests generated from sub-feature User Interface 424; Application Server 434 may serve the logic to sub-features User Interface 424, Authentication 426, and Storing Data 428; and Database 436 may have the data saved by sub-feature Storing Data 428. As used herein, a "component," such as Web Server 432, Application Server 434, or Database 436, may generally refer to a part or element of one or more software application and/or hardware apparatus, modules, devices, or subsystems. A software component may, for example, be an element of a software system programmed to provide a predefined service or event. A hardware component may, for example, be a variety of elements of a hardware system that has the capability to process instructions.

The code implementation for fixes may be stored in Code Directory 440. The directory structure of Code Directory 440 may in some embodiments be organized according to the multi-layered architecture illustrated in FIG. 4. In some embodiments, the path leading to the code may have path/directory structures, such as FEATURE1\SUBFEATURE1\MODULE1\ . . . and FEATURE2\SUBFEATURE2\MODULE2\ . . . .

As used herein, the term "directory" may be used to refer to any means of logically organizing data on a computer. Data may be organized in logical directories that do not necessarily correspond to a particular storage device. Even though data may exist on many different storage devices, data can be organized into logical directories and subdirectories so that a user can easily locate information. In one example, in Windows® operating system, the main directories are referred to as volumes. Volumes include, for example, the C drive and D drive, which are typical volumes of storage that are located on a computer, even though the C or D drive itself may comprise a collection of hard disks or a portion thereof. It is not necessary for a user to know from which particular disk to obtain information. Thus, directories exist to help a user navigate through the data on the computer. Other directories may exist to which the computer has access through a network.

Module 450 may be a logical unit to serve one or more Sub-Features 422 and used by one or more Components 430. For example, a module for Authentication 426 may be used by components Database 426 and Application Server 434 when serving authentication requests from sub-feature User Interface 424. Each Module 450 may include one or more functions. And each function may serve a specific purpose.

Figure 5:
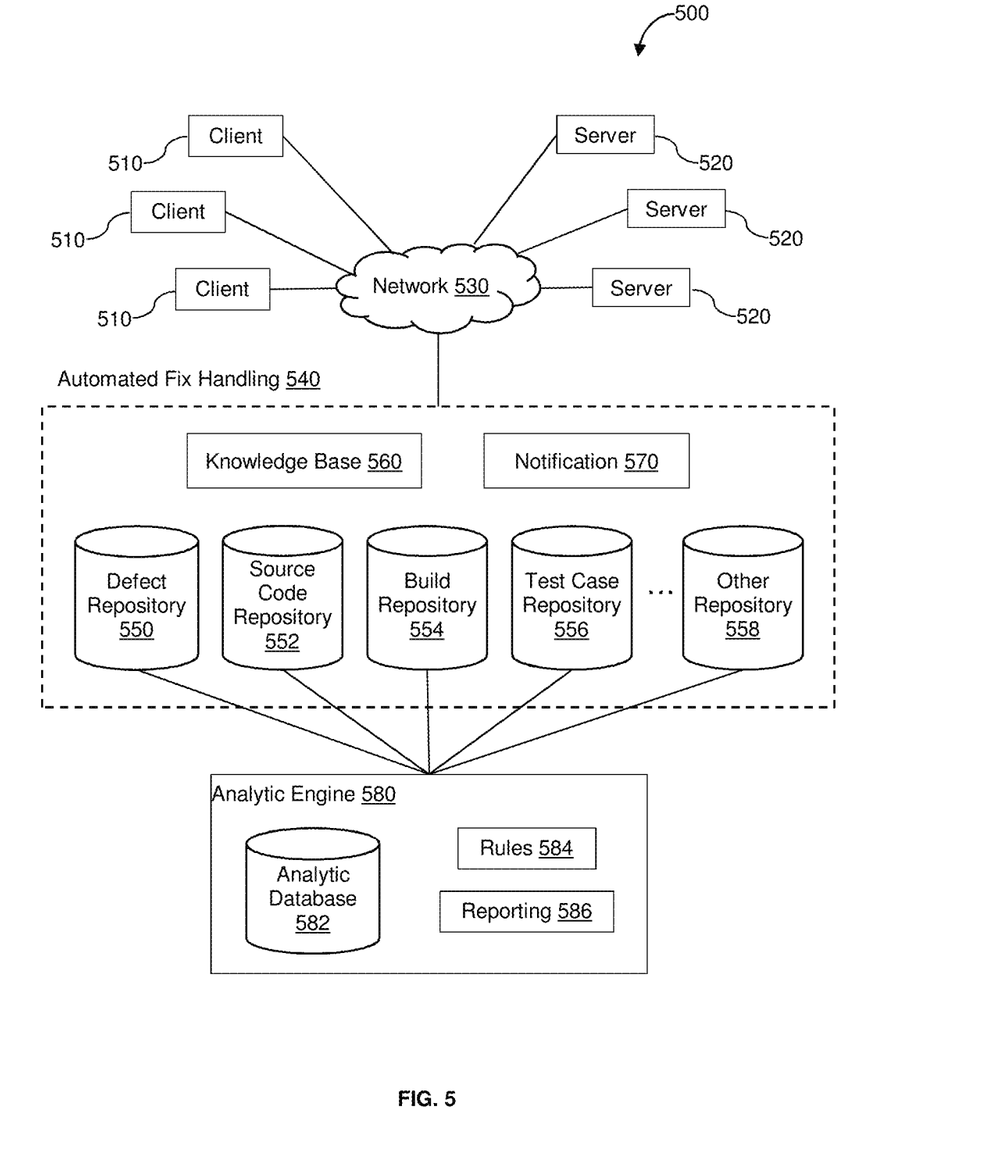
FIG. 5 is a diagram of a system configured to implement a predictive model of automated fix handling in accordance with some embodiments.

FIG. 5 illustrates an exemplary environment in which a predictive model of automated fix handling may be implemented, in accordance with some embodiments. System 500 may include Clients 510, Servers 520, Automated Fix Handling module 540, and Analytic Engine 580 connected by Network 530. Client 510 may, in some embodiments, represent a system, such as a laptop, a desktop, a mobile device, or a virtual machine, etc., used to generate requests to applications executing in Servers 520. Server 520 may represent a web and/or application server, which executes applications capable of performing tasks requested by users using Clients 510. The applications may perform tasks on data maintained internally or externally and send the result to Clients 510. It should be noted that different modules of the same application may be deployed and executed on different systems to facilitate the performance of tasks. As illustrated by FIG. 5, there may be any number of clients and any number of servers.

Network 530 may provide connectivity to the various systems of FIG. 5 and may, in some embodiments, be implemented using protocols such as Transmission Control Protocol (TCP) and/or Internet Protocol (IP), which are well known in the relevant arts. Network 530 may also be implemented to provide support for various storage architectures such as storage area network (SAN), Network-attached Storage (NAS), Direct-attached Storage (DAS), etc.

In some embodiments, Automated Fix Handling 540 may store data in various repositories, such as Defect Repository 550, Source Code Repository 552, Build Repository 554, Test Case Repository 556, and Other Repository 558, among others. Automated Fix Handling 540 may also include Knowledge Base 560 and Notification 570. Knowledge Base 560, in accordance with some embodiments, may be a non-volatile storage maintaining entries such as recommendations for fixing the defects determined in System 500. The identified recommendations may include possible solutions, suggestions, and workarounds for fixing the defects. The content of the recommendations may be derived from descriptions associated with defects stored in Defect Repository 550 and comments associated with a fix stored in Source Code Repository 552, among others. At various stages of the automated fix handling, Notification 570 may be sent through web pages, RSS feed and/or emails, among others. The content of Notification 570 may be obtained from entries stored in databases, or logs, reports stored in repositories.

Defect Repository 550 may be used to receive defects submitted by users. The defects may include, without limitation, logical errors, functional errors, and/or runtime errors that may cause applications not performing and/or functioning as expected. When submitting a defect, the defect may be associated with various attributes. Such attributes may include a unique defect identifier, a description describing the defect, owner assignment, status of the defect, types of the defect, and tags of the defect, among others.

The status of the defect may be used to facilitate the goals of accountability and closed-loop problem resolution. Critical stake owners may be notified automatically of the defect status. Once notified, responsible owners may take corrective actions and the status of a defect may change. Once the defect status is changed, more automated notifications may be sent to critical stake owners for further actions. For example, a set of defect status may be action initiated, assigned-dev, assigned-qa, in progress-dev, in progress-qa, closed-dev, closed-qa, and action closed. After a defect is submitted, whenever the defect status changes, automated notification may be triggered and sent by Notification 570. Critical stake owners may be notified automatically, so that they may take ownership and appropriate actions. The automated process may continue until the status of the defect is action closed.

In some embodiments, the types of the defect may be selected from a list of options provided by a defect tracking tool associated with Defect Repository 550. Such defect tracking tool may let a user select from a list of categories indicating the type of the defect submitted, such as whether the defect is a cumulative hotfix. Subcategories, such as whether the defect type is related to data loss, data unavailability, or security vulnerability may be further provided to the user. The subcategories may also indicate the severity of the defect. Depending on the severity of the defect, more automated steps may be taken to expedite the availability of the fix to users. For example, if a defect belongs to a subcategory indicating the defect may cause system crash, the defect may be assigned a high severity and qualify for automatic check-in approvals. In some embodiments, the defect tracking tool may be Rational ClearQuest®. ("ClearQuest" is a registered trademark of International Business Machines Corporation in the United States, other countries, or both.) Other defect tracking tools providing similar functionalities may also be used.

The data for tag configuration may be pulled automatically or fetched on demand from various sources such as Defect Repository 550 and/or Source Code Repository 552, among others. Defects may be categorized according to the tag data. The categorized defects may then be linked to the multi-layered software application for fixes in predictive modeling. For example, the tags may indicate whether the defect submitted is for one or more features, sub-features, and/or components of a fix. The tags may also associate a defect with one or more modules in a fix. The linkage of various categories of defects to features, sub-features, components, and modules of the fixes may be used in building a current set of metrics in predictive analysis.

Source Code Repository 552 may be used to receive and store check-in data of fixes. Source Code Repository 552 may be associated with a version control system to manage the numerous versions of source code checked in. During code development for a fix, developers may check out source code from Source Code Repository 552, work on the code, and check back in at the end of the work session. Version control system, such as Concurrent Versioning System (CVS), generally keeps track of what changes were made to the source code. Other version control systems providing similar functionalities may also be used.

The check-in data stored in Source Code Repository 552 may include source code to fix one or more defects received in Defect Repository 550. Unique defect identifiers stored in Defect Repository 550 may be used as a cross reference to associate source code with defects. In addition, the check-in data may also include a developer's name, source code file name, product, release, check-in time, total number of lines, number of lines changed, and comments etc. Source code stored in Source Code Repository 552 may be organized in a directory structure. The directory structure may indicate the association of a module to one or more corresponding features, sub-features, and/or components. Each module may further include one or more functions.

In some embodiments, the same version control system may be associated with Build Repository 554. The version control system may execute scripts to compile source codes stored in Source Code Repository 552 and generate executable codes to store in Build Repository 554. Each build may be associated with a version and the version of the fix. Following a successful build process, the build stored in Build Repository 554 may be tested using test cases stored in Test Case Repository 556. To automate the fix handling process, test cases may be mapped to one or more builds. A determination of a clean build may trigger automated execution of corresponding test cases. Upon successful completion of testing, a build may be released as postings to users.

Still referring to FIG. 5, Analytic Engine 580 may pull tags data from various repositories in Automated Fix Handling 540, establish dependency mapping, and store the mapping in Analytic Database 582. The dependency mapping may be used as a model of current metrics in predictive analysis. Different defects and the corresponding fixes as well as automated test cases may be assigned to different categories based on their attributes. Rules 584 may be applied to the dependency mapping for calculating code vulnerability in the predictive model. Based on Rules 584, values may be assigned to different attributes in metrics for predictive analysis. Applying Rules 584 to the dependency mapping, the predictive model may accurately calculate code impact and vulnerability. Reporting mechanism 586 may retrieve data from Analytic Database 582 and present the data in various formats, such as PDF, HTML, XML etc.

In some embodiments, Analytic Database 582 may include defect disposition type, code density, customer impact, and dependency mapping, among others to help identify the cause and impact of code vulnerability. Defect density may be used for reporting the amount of code related to defects. For example, for a fix with 2,500 lines of code, code changes may be reported as 2.5 in Kilo Lines of Code (KLOC). Based on the dependency map stored in Analytic Database 582, the fix may be related to fifteen reported defects. The defect density may be reported as six defects per KLOC. Customer impact may be the number of customers impacted by a fix or granule parts of a fix. The information stored in Analytic Database 582 may be pulled automatically or retrieved on demand from various repositories of Automated Fix Handling 540. Alternatively, a user interface may be provided by Analytic Engine 580 to enter the information.

Defect disposition type may indicate whether a defect is related to functional issues, non-functional issues or other type. For example, a function issue may be an error in direct workflows, a defect causing application crashes and/or causing application hang. Non-function issues may be performance issues, scalability issues, and/or reliability issues. And environmental issues may be related to interoperability between third parties, driver conflicts with third party products, and/or application behaving in specific unsupported platforms but not handled gracefully.

Figure 6:
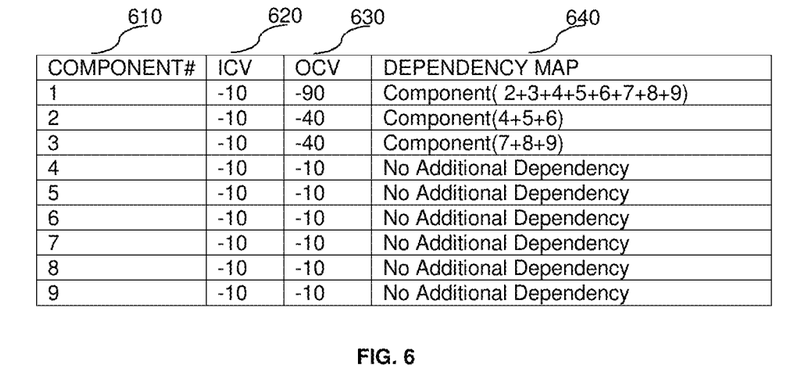
FIG. 6 is a table illustrating the association of components with individual code vulnerability, overall code vulnerability, and dependency map in accordance with some embodiments.

FIG. 6 is a table illustrating an exemplary dependency mapping of nine components. As shown in the table, nine example components 610 denoted as 1-9 are stored in the dependency mapping. The dependency map column 640 for component 1 shows component 1 depends on components 2-9. Similarly, component 2 depends on components 4-6; and component 3 depends on components 7-9. Components 4-9 have no dependent components. Based on the rules and the dependency mapping, ICV 620 and OCV 630 for each component may be calculated.

Figure 7:
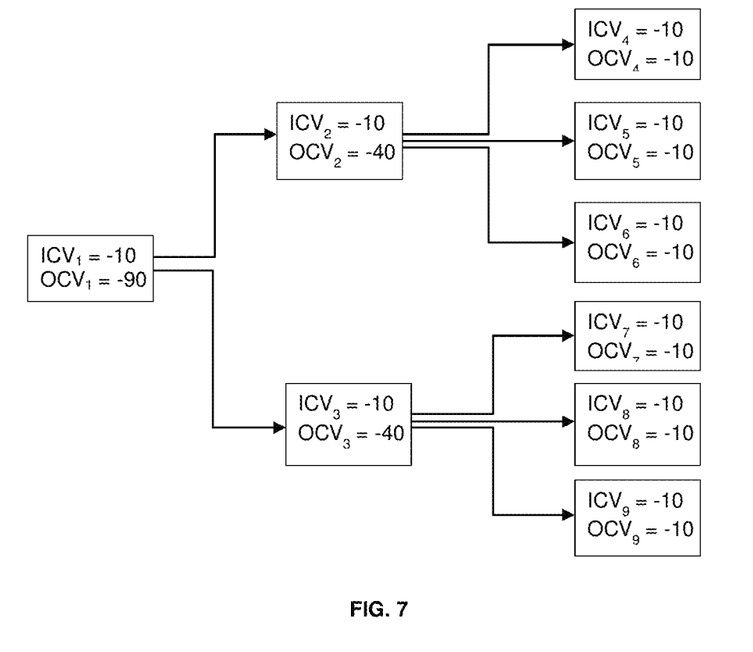
FIG. 7 is a diagram illustrating the association of components with individual code vulnerability, overall code vulnerability, and dependency map in accordance with some embodiments.

FIG. 7 illustrates a visual representative of the same exemplary dependency mapping. Reporting mechanism as part of the analytic engine may present the dependency mapping as reports in various table and/or visual formats as illustrated in FIG. 6 and FIG. 7. Though the exemplary dependency mapping illustrated in FIG. 6 and FIG. 7 is at component level, the dependency mapping may be at other layers of software applications, such as at feature, sub-feature, component, code directory, module, and/or function level.

Referring back to FIG. 5, Rules 584 as part of Analytic Engine 580 may be a set of functions for Individual Code Vulnerability (ICV) and Overall Code Vulnerability (OCV) calculation in predictive modeling. The set of functions may be applied to data stored in Analytic Database 582 to quantify code vulnerability in predictive modeling. For example, a first rule stored in Rules 284 may assign each occurrence of a type of defect an impact value of −1. Assume the exemplary components 1-9 of FIG. 6 and FIG. 7 are related to ten occurrences of the type of defect. Applying the first rule to the exemplary components 1-9, each component may have ICV of −10.

In another example, a second rule stored in Rules 584 may assign each severity one defect an impact value of −4, severity two defect −3, severity two defect −2, and severity four defect −1 respectively. Based on the data stored in Analytic Database 582, a component may be related to two occurrences of defects for each of the severity. Applying the second rule, the calculation for ICV of the component may be as follows.

$$ICV: 2*(-4)+2*(-3)+2*(-2)+2*(-1)=-20$$

In yet another example, a third rule stored in Rule 584 may be based on the number of customers impacted. Each defect in the Defect Repository 550 may be associated with the number of customer impacted. After establishing the linkage between defects and fixes, the customer impact data may be stored in Analytic Database 582 as part of the dependency mapping. Following the linkage between defects and fixes, the customer impact of a component within a fix may be determined. The third rule may assign each customer impacted a value of −5. According to the third rule, for each customer impacted, a value of −5 may be assigned. Applying the third rule to the data retrieved from Analytic Database 582, a component within a fix impacting three customers may have ICV of −15.

Figure 8:
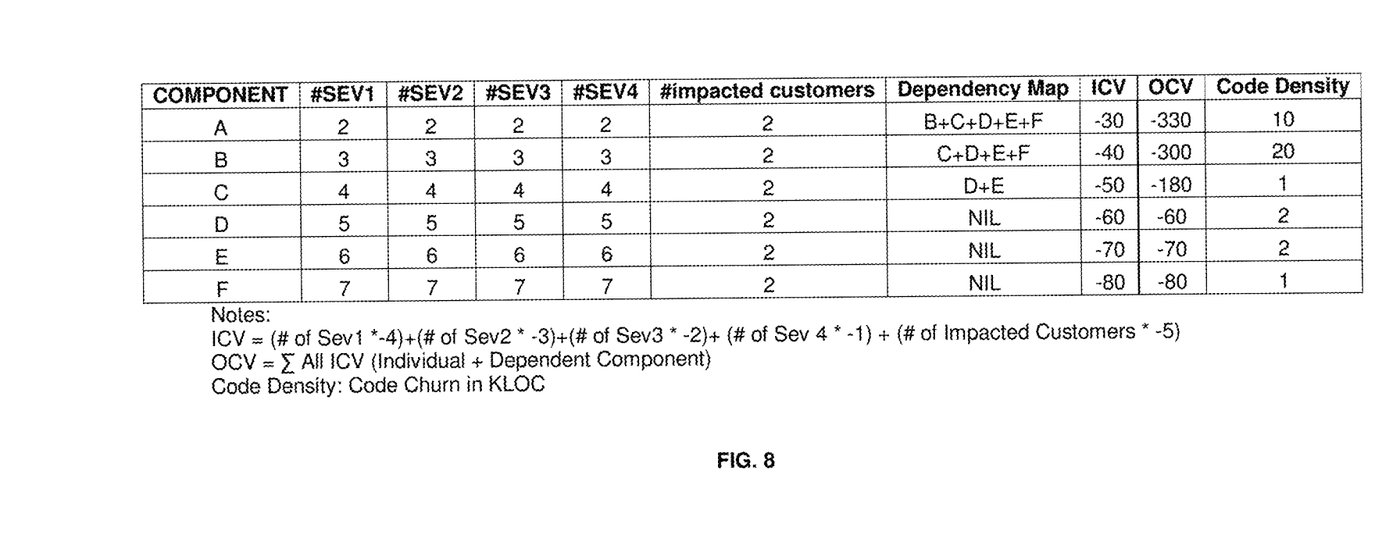
FIG. 8 is a table illustrating the association of components with defect attributes, dependency map, individual code vulnerability, overall code vulnerability, and code density in accordance with some embodiments.

The rules stored in Rule 584 may also assign values to a plurality of defect attributes. FIG. 8 illustrates an exemplary dependency mapping with rules applied for predictive analysis. A set of rules may assign a value of −4 to each severity one defect associated with component C, −3 to each severity two defect, −2 to each severity three defect, −1 to each severity four defect, and −5 to each customer impacted. The calculation for ICV and OCV of a component may be defined by the set of rules as follows:

$$ICV=(\# \text{ of Sev1}*-4)+(\# \text{ of Sev2}*-3)+(\# \text{ of Sev3}*-2)+(\# \text{ of Sev 4}*-1)+(\# \text{ of Impacted Customers}*-5)$$

$$OCV=\Sigma \text{ All ICV(Individual+Dependent Component)}$$

Based on the data stored in Analytic Database 582, component C may be associated with eight field reported defects, namely two severity one defects, two severity two, two severity three, and two severity four defects respectively. And based on the customer impact data stored in Analytic Database 582, component C may have impacted two customers. Thus, applying the rule for ICV calculation, component C may have an ICV of −30. Further, based on the dependency mapping stored in Analytic Database 582, component C may have dependency on D and E. Applying the rule for OCV calculation, component C may have an OCV of −180.

The examples shown in FIG. 6, FIG. 7, and FIG. 8 illustrate one benefit of the present invention. The formalized process establishes the linkage from defects to multi-layered software application for fixes. The linkage may be used to establish a classification model in the predictive analysis to benefit the entire automated release process. Defects are categorized based on attributes such as severity, defect disposition type, and/or customer impact etc. And fixes are decomposed to feature, sub-feature, component, module, and function etc. Applying rules to the metrics, code vulnerability of fixes for defects may be quantified in the predictive analysis.

For example, in FIG. 6 and FIG. 7, although the ICV of component 2 is the same as components 4-6, the OCV of component 2 is −40, much higher than OCV of components 4-6. This is due to the dependency of component 2 on components 4-6. The metrics may indicate that due to the cumulative nature of component 2, it may be more vulnerable than component 4-6 alone. The quantified predictive value of code vulnerability may then be used to develop more rigorous automated test cases for more vulnerable code fixes.

Figure 9:
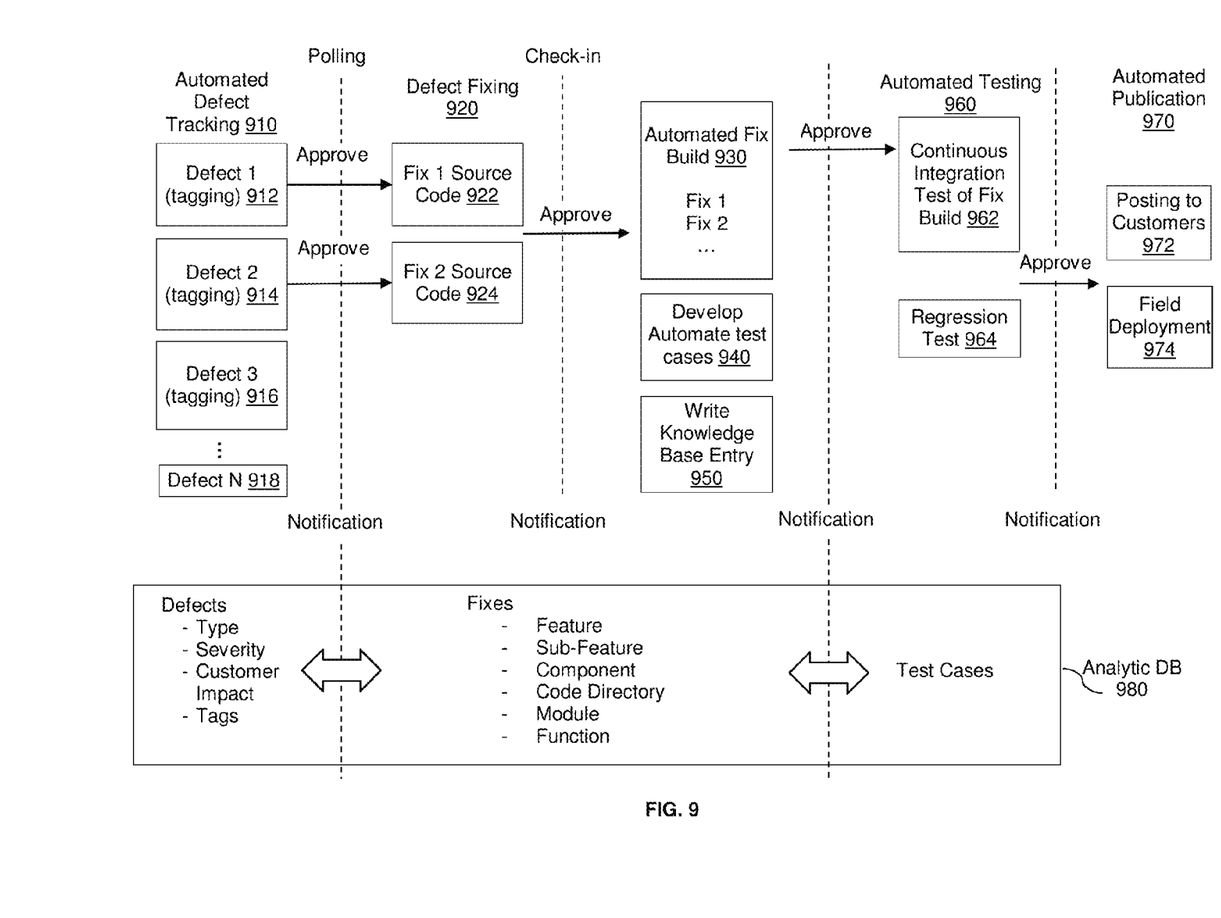
FIG. 9 is a flow chart illustrating a method to perform predictive modeling for an automated fix release in accordance with some embodiments.

FIG. 9 illustrates an exemplary predictive model of automated fix handling process flow, in accordance with some embodiments. In FIG. 9, defects may be submitted and entered into defect repository for Automated Defect Tracking 910. When submitting each defect, the description of the defect as well as the type, severity, and customer impact of the defect may be specified. For example, Defect 1 912, Defect 2 914, and Defect 3 916 may be categorized as cumulative hotfix candidates or some high severity defects. On the other hand, Defect N 918 may be categorized as a low severity defect.

Tags may be associated with each defect for mapping of defects to fixes in Analytic Database 980. For example, one defect may be tagged with one or more features, sub-features, and/or components of fixes. Further, tagging may also indicate disposition types, such as whether the defect is associated with functional, non-function, and/or environmental issues. Once the tags are entered for each defect, the data may be pulled into Analytic Database 980 for predictive analysis.

In some embodiments, based on predefined rules, an automated polling process may search through defects submitted to identify one or more types of defects. Applying the rules, Defect 1 912, Defect 2 914, and Defect 3 916 may be identified by the automated polling process due to the type or the severity value. Upon identifying certain defects, an automated notification may be sent to critical stake owners. Critical stake owners may then approve or reject a defect as an automated fix candidate. As illustrated in FIG. 9, critical stake owners may approve only Defect 1 912 and Defect 2 914, but reject Defect 3 916 due to its low severity. Only approved defects may be worked on during Defect Fixing 920.

Once the source codes for Defect Fixing 920 are checked in, an automated notification may be sent to critical stake owners for approval. Upon approval of the check-ins, Automated Fix Build 930 may start to compile source codes and generate executable codes as a build. The build may cumulatively include fixes for various approved defect fixes, such as Fix 1, Fix 2, etc. In parallel, automated test cases may be developed, denoted as 940 in FIG. 9, to map test cases to the build. Similarly, in parallel, knowledge base entries may be written, denoted as 950 in FIG. 9, based on defects description and comments associated with check-ins.

The check-ins may be stored in code repository and organized in directory structure. The code directory structure may indicate whether a module is associated with a feature, a sub-feature, and/or component. Using the path of the module, the multi-layered architecture of the fix may be derived and stored as part of the dependency mapping in Analytic Database 980. The dependency mapping may show each feature includes multiple sub-features; each sub-feature includes multiple components; each component includes one or more modules stored in one or more code directory; and each module includes one or more functions.

After defects are categorized and fixes are decomposed to granular parts, a metrics for predictive analysis may be derived. First, the linkage between defects and fixes may be established by deriving data from the defect repository. Tags associated with each defect stored in the repository may include feature, sub-feature, and/or component information of fixes for each defect. The defects to fixes linkage may then be established by deriving the association of module to feature, sub-feature, and/or component from code directory. The derived module path may also be entered as tags in the defect repository for cross referencing.

Once Automated Fix Build 930 completes, an automated notification may be sent to critical stake owners for approval. After approving the build, another automated notification may be sent to critical stake owners. Upon approval, Automated Testing 960 may execute the automated test cases to run Continuous Integration Test of Cumulative Fix Build 962. Further, more extensive Regression Test 964 may be conducted. Upon completion of Automated Testing 960, an automated notification may be sent to critical stake owners for approval. Upon approval of a successful testing, Automated Publication 970 may publish Posting to Customers 972 and the published cumulative hotfix may be deployed in field, denoted as 974 in FIG. 9.

In the predictive model of automated fix handling, test cases may also be added to the dependency mapping stored in the analytic database. As illustrated in FIG. 9, the information derived from the defect repository and source code repository may first establish the linkage between defects and fixes. Further mapping, such as from feature to code directory then to automated test cases may establish an end-to-end linkage for predictive analysis during the automated fix release process.

For example, one field reported defect may require a fix that includes one or more features. The same fix may be used for multiple field reported defects. Decomposing the fix to multiple features, each feature may be associated with multiple field reported defects. The feature may also include a plurality of sub-features, components, modules and functions stored in a plurality of code directories. During predictive analysis, each feature, sub-feature, component, module, and/or function may be analyzed to determine code vulnerability based on the linkage to the defects. Some defects may have higher severities. Depending on the rules, fix codes associated with such defects may have higher ICV and OCV. The quantified code vulnerability result may indicate whether the fix codes are more vulnerable and less stable. The information may then be used to assist the development of automated test cases for more thorough testing of the fixes.

In addition to the benefit stated above, the predictive model of automated fix release in accordance with some embodiments described herein has several other benefits. First, after deriving a current metrics from historical data, the predictive model may be used to determine priorities for code refactoring and highlight the cumulative vulnerability for any decomposed parts of the fixes. As future releases build cumulatively on top of current releases, the highlighted cumulative vulnerability may accurately predict the code vulnerability of future releases.

As stated previously, software applications often require updates after major releases to ensure their proper functioning. Large pieces of software that significantly change a program may be referred to as service packs. A service pack may be a collection of updates, fixes, or enhancements to a software product delivered in the form of a single installable package. In between the releasing of different versions of service packs, some relatively small in size software packages may be made available to users that aim at fixing problems, such as defects in the source code, usability and/or performance etc. Such software packages, which contain pointed code changes and have shorter software development cycle, are known as hotfixes. And accumulation of hotfixes over a period of time may be delivered as cumulative hotfixes.

Using the predictive model of automated fix handling, any future releases built upon the current code base, such as cumulative hotfixes, may be better designed during code refactoring and reduce cumulative vulnerability. For example, component A may be associated with five defects in a particular area. And component B may be associated with two high severity defects. If component C is dependent on both component A and B, based on OCV calculation, the cumulative vulnerability will be much higher for component C. Reviewing the quantified cumulative vulnerability in predictive analysis, better decisions may be made when choosing what features to include in future releases.

Third, the predictive model of automated fix handling is highly scalable. Defects may be categorized and tagged for various severities, disposition types, and customer impacts, among others. Fixes may be decomposed according to multi-layered architectures or any other software engineering methodologies. In the dependency mapping, each decomposed part in any level of the multi-layered architecture may be linked to any subcategories of defects. The rules may be customized to assign values to one or more attributes of defects for code vulnerability calculation. For example, ICV may be based on severity value, the nature of the defect, and/or customer impact. Since the nature of the defect may be functional, non-function, and/or environmental issue, ICV may also be a combination of various defect attributes as follows.

$$ICV_{(feature\_X)} = ICV_{(functional)} X + ICV_{(non-functional)} X + ICV_{(environmental)} X$$

The formula for the vulnerability calculation may be any other formula indicative of the linkage between defects and fixes. The proposed algorithm for calculating ICV and OCV should not be interpreted in a limitative manner. Indeed, the ICV and OCV calculations may take into account additional and/or different types of use cases, or more generally in any other way according to the predictive model. With the flexibility of different ways to categorize defects and decompose fixes, the predictive model of automated fix handling may be scalable to any products and perform the predictive analysis of code vulnerability at any granularity. Thereby, through use of an embodiment of the present invention, a quantitative indication of the code vulnerability is thereby provided.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A processor-executed method for providing a predictive model of an automated fix release process, the method comprising:
    tagging a defect indicating attributes of the defect and a feature associated with the defect, wherein the feature is included in a fix for the defect;
    assigning a value to each of the attributes;
    establishing a mapping of the defect and the feature based on the tagging;
    storing codes implementing the fix in directories, wherein the code directories are structured to indicate features of the fix;
    adding to the mapping an association of the features and the fix derived from the code directories;
    adding an association of a test case with the features to the mapping; and
    calculating a vulnerability of the fix, the features, and the codes using the value assigned to each of the attributes of the defect and the mapping;
    decomposing each of the features to sub-features;
    adding an association of the features and the sub-features to the mapping;
    calculating an individual value for each of the sub-features as a function of the values assigned to attributes of defects associated with the sub-features derived from the mapping; and
    calculating an overall value for the each of the features as a function of the individual value for each of the sub-features.

2. The method as recited in claim 1, further comprising:
    reporting the vulnerability and the mapping.

3. The method as recited in claim 1, wherein the vulnerability includes:
    an individual value for each of the features as a function of the values assigned to attributes of defects associated with the features;
    an overall value for each of the features calculated as a function of the values assigned to attributes of the defects associated with the codes based on the mapping; and
    an overall value for the fix as a function of the individual value for each of the features.

4. The method as recited in claim 1, further comprising:
    decomposing each of the sub-features to components;
    adding an association of the sub-features and the components to the mapping;
    calculating an individual value for each of the components as a function of the values assigned to attributes of defects associated with the components derived from the mapping; and
    calculating an overall value for the each of the sub-features as a function of the individual value for each of the components.

5. The method as recited in claim 1, wherein the defect includes a plurality of defects and tagging the defect includes tagging each of the plurality of defects indicating the attributes of each of the plurality of defects and the feature associated with each of the plurality of defects.

6. The method as recited in claim 1, wherein the fix includes a plurality of fixes and the code directories are structured to indicate features of each of the plurality of fixes.

7. A system comprising:
    a computer processor;
    a memory storing instructions that when executed by the computer processor cause the computer processor to perform acts comprising:

tagging a defect indicating attributes of the defect and a feature associated with the defect, wherein the feature is included in a fix for the defect;

assigning a value to each of the attributes;

establishing a mapping of the defect and the feature based on the tagging;

storing codes implementing the fix in directories, wherein the code directories are structured to indicate features of the fix;

adding to the mapping an association of the features and the fix derived from the code directories;

adding an association of a test case with the features to the mapping;

calculating a vulnerability of the fix, the features, and the codes using the value assigned to each of the attributes of the defect and the mapping;

decomposing each of the features to sub-features;

adding an association of the features and the sub-features to the mapping;

calculating an individual value for each of the sub-features as a function of the values assigned to attributes of defects associated with the sub-features derived from the mapping; and calculating an overall value for the each of the features as a function of the individual value for each of the sub-features.

8. A computer program product comprising a non-transitory computer usable medium having machine readable code embodied therein for:

tagging a defect indicating attributes of the defect and a feature associated with the defect, wherein the feature is included in a fix for the defect;

assigning a value to each of the attributes;

establishing a mapping of the defect and the feature based on the tagging;

storing codes implementing the fix in directories, wherein the code directories are structured to indicate features of the fix;

adding to the mapping an association of the features and the fix derived from the code directories;

adding an association of a test case with the features to the mapping;

calculating a vulnerability of the fix, the features, and the codes using the value assigned to each of the attributes of the defect and the mapping;

decomposing each of the features to sub-features;

adding an association of the features and the sub-features to the mapping;

calculating an individual value for each of the sub-features as a function of the values assigned to attributes of defects associated with the sub-features derived from the mapping; and calculating an overall value for the each of the features as a function of the individual value for each of the sub-features.

9. The method as recited in claim 1, wherein the attributes tagged include at least one of defect disposition type, severity of the defect, and customer impact of the defect.

10. The method as recited in claim 9, wherein the defect disposition type includes at least one of a functional issue, a non-functional issue, or an environmental issue.

11. The method as recited in claim 1, further comprising:
automatically generating test cases for the fix based on the calculated vulnerability.

12. The method as recited in claim 5, further comprising:
calculating a code density of the codes;
identifying defects among the plurality of defects the codes are associated with from the map; and
dividing the code density by the number of defects to calculate a defect density indicating the vulnerability of the codes.

13. The method as recited in claim 1, further comprising:
identifying modules in the codes and functions in the modules;
adding an association of the modules and the functions to the mapping; and
calculating the vulnerability of the modules and the functions as a function of the values assigned to attributes of defects associated with the modules and the functions derived from the mapping.

* * * * *